Dec. 27, 1955

H. T. HALL 2,728,651

DIAMOND ABRASIVE WHEEL

Filed Nov. 25, 1952

Inventor:
Howard T. Hall,
by Paul A. Frank
His Attorney.

United States Patent Office

2,728,651
Patented Dec. 27, 1955

2,728,651
DIAMOND ABRASIVE WHEEL

Howard T. Hall, Colonie, N. Y., assignor to General Electric Company, a corporation of New York Application November 25, 1952, Serial No. 322,506

3 Claims. (Cl. 51—293)

This invention relates to an abrasive wheel having a cutting edge composed of a plurality of diamonds; more particularly, the invention relates to an abrasive wheel utilizing a plurality of diamonds in a mounting that insures extremely powerful adherence of the diamonds to the body of the wheel.

U. S. Patent 2,570,248 to Kelley disclosed a method of forming a very strong ceramic-to-metal seal utilizing titanium hydride. The Kelley patent indicated that the method could be utilized to achieve a good bond between diamonds and metals or metal bodies. It is one object of the present invention to provide a diamond cutting tool in which titanium hydride is utilized to obtain a secure and strong mounting for the diamonds.

It is another object of the invention to provide a diamond cutting tool in which cooling of the cutting surface is easily achieve.

It is a further object of the invention to provide a diamond cutting tool in which the same cutting effect is achieved with small diamonds that was previously achieved with much larger diamonds which were mounted in the conventional manner.

Briefly stated, in accordance with one of its aspects, my invention comprises an abrasive device in which a rotatable metal wheel with an adherent solder coating has a plurality of diamonds mounted on the solder by a titanium hydride bond uniformly positioning the diamonds over the solder coating.

Figure 1:
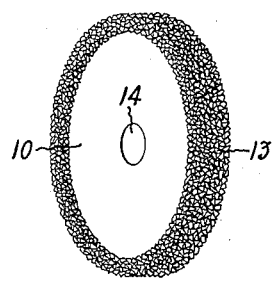
Figure 2:
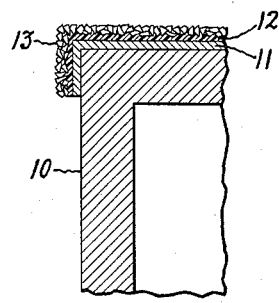

Figure 1 of the drawing illustrates an abrasive wheel made in accordance with my invention wherein the abrasive coating is present on both the outer rim of the wheel and a portion of the side surface. Figure 2 is a sectional view of a portion of the wheel shown in Figure 1.

The wheel consists of a body portion 10 having a central aperture 14 for mounting the wheel on a shaft. The wheel may be composed of steel or other material possessing the requisite strength. The portions of the wheel 10 which it is desired to utilize as abrasive surfaces are coated with a layer 11 of solder (Fig. 2). While a wide variety of materials are satisfactory as solders, I prefer to utilize a solder possessing considerable tensile strength and melting at a temperature above the decomposition point of titanium hydride. An eutectic mixture of silver and copper is a satisfactory solder. Other satisfactory solders include those containing iron, nickel, chromium, boron, tin, lead, aluminum, cadmium, bismuth and zinc in various mixtures and proportions.

The solder layer 11 serves as a bonding surface for titanium hydride indicated at 12. The titanium hydride serves as a matrix for a layer of diamond grit 13. Titanium hydride will cause wetting of the surface of a diamond thereby promoting a very strong bond between the diamond and the titanium.

The layers 11, 12 and 13 illustrated in Figure 2 are exaggerated in thickness for purposes of clarity of illustration. The solder layer 11 does not have a critical thickness and it may be made quite thick if desired. However, the titanium hydride wets out the diamonds with a very thin coat.

In preparing the diamonds for application to the wheel, I prefer to stir a diamond grit in a slurry of titanium hydride in an organic liquid. Amyl acetate, ethyl acetate, ethyl alcohol, and other organic liquids which are easily evaporated are satisfactory for use in the slurry. The diamonds are stirred in the slurry until their surfaces are wetted with titanium hydride. The organic liquid is then evaporated and the titanium hydride coated diamonds are sprinkled over the solder layer 11. The wheel is then heated above about 650° C. to dissociate the hydride and bring about a strong intimate bond between the titanium and solder. The heating step is preferably carried out in a vacuum or a reducing atmosphere. Temperatures above 400° C. are sufficient to bring about dissociation of the titanium hydride. Thus, for solders melting at temperatures around 400° C., the heating step may be carried out at this lower temperature in order to avoid the loss of solder.

Cutting tools made in accordance with my invention can stand a great deal of abuse without having the diamonds work loose. Since the diamonds may protrude from the solder rather than be embedded therein, cooling may readily be accomplished. The absence of voids between the diamonds and their mountings results in very satisfactory heat transfer. Abusive use wherein the friction of the surface being cut against the diamonds is sufficient to heat the diamond tips to a bright glow will not dislodge the diamonds and the transfer of heat from the glowing tips is so good that the diamonds can survive operation at a much higher temperature without alteration of the crystal structure than can diamonds in conventional mountings.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. The method of making an abrasive device which comprises applying an adherent solder coating to a rotatable metal wheel, wetting the surface of a plurality of diamonds with titanium hydride, applying said diamonds uniformly over said coating, and dissociating the hydride and melting the solder by heating the device to a temperature above 400° C. in an atmosphere inert with respect to the metal of the hydride.

2. The method of making an abrasive device which comprises applying an adherent solder coating to a rotatable metal wheel, stirring a plurality of diamonds in a slurry containing titanium hydride in an organic solvent, evaporating the solvent, applying the titanium hydride coated diamonds uniformly over the solder coating, and dissociating the hydride and melting the solder by heating the device to a temperature above 400° C. in an atmosphere inert with respect to the metal of the hydride.

3. The method of making an abrasive device which comprises applying a solder coating to the rim of a metal wheel, stirring a diamond grit in an amyl acetate slurry containing titanium hydride, evaporating the amyl acetate, applying the hydride coated grit uniformly over the outer surface of said rim, and dissociating the hydride and melting the solder by heating the device to a temperature above 400° C. in an atmosphere inert with respect to the metal of the hydride.

References Cited in the file of this patent
UNITED STATES PATENTS

| | | |
|---|---|---|
| 2,343,957 | Crompton | Mar. 14, 1944 |
| 2,427,565 | Liger | Sept. 16, 1947 |
| 2,562,587 | Searingen | July 31, 1951 |
| 2,570,248 | Kelley | Oct. 9, 1951 |